Dec. 8, 1925.  
F. WATKINS  
BRAKE  
Filed Feb. 28, 1925  
1,565,130
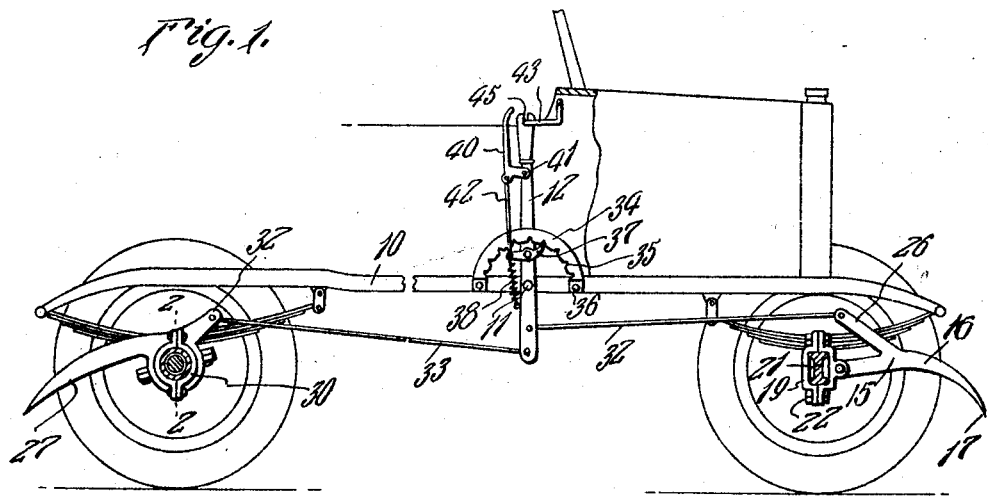
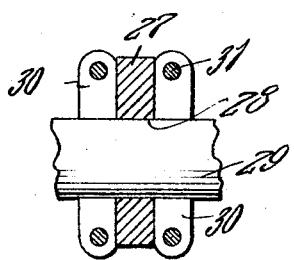
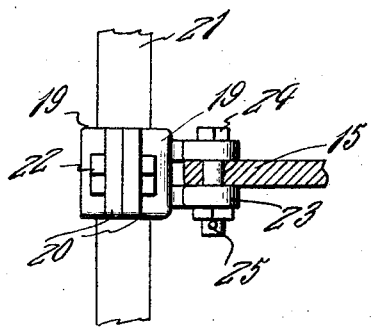
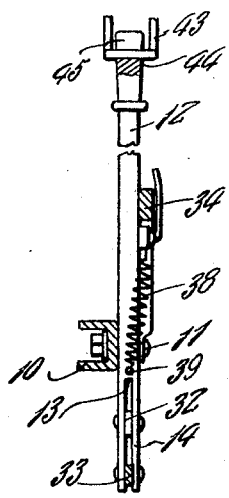
Inventor  
Frank Watkins  
By Victor J. Evans  
Attorney Patented Dec. 8, 1925.

1,565,130

UNITED STATES PATENT OFFICE.

FRANK WATKINS, OF HUNTINGTON, INDIANA.

BRAKE.

Application filed February 28, 1925. Serial No. 12,367.

*To all whom it may concern:*

Be it known that I, FRANK WATKINS, a citizen of the United States, residing at Huntington, in the county of Huntington and State of Indiana, have invented new and useful Improvements in Brakes, of which the following is a specification:

This invention relates to improvements in brakes and contemplates the provision of means positioned within easy access of a driver of a vehicle in order that the brakes included in the rear and front of the vehicle may be alternately thrown to direct engagement with the road.

Another object of the invention is the provision of hinged means included upon the dash or other suitable portion of the vehicle and adapted to be brought into engagement with the upper portion of the operating handle in order that the same may be held firmly in its locked or unlocked position.

A further object of the invention is the provision of novel forms of associating means for the rear axle housings and front axle in order that the brakes may be easily operated by the lever and be alternately brought into direct engagement with the road or the like in order to prevent movement of the vehicle backward and forward as well as sideways.

With the above and other objects in view, the invention further includes the following novel features and details of construction, to be hereinafter more fully described, illustrated in the accompanying drawing and pointed out in the appended claims.

In the drawing:

Figure 1 is a side elevation of an automobile showing the specific mounting of the hand operated lever, means for holding the same in position and showing the brakes in their released position.

Figure 2 is a transverse section taken on line 2—2 of Figure 1 and clearly illustrating the specific mounting of the brake upon the rear axle housing.

Figure 3 is a detailed sectional view showing the specific mounting of the front axle brake with the associating means connected therewith.

Figure 4 is a longitudinal section taken through one of the side bars of a vehicle and showing the specific mounting of the hand operated lever per se.

Referring to the drawing in detail, wherein like characters of reference denote corresponding parts, the reference 10 indicates one of the side bars of a vehicle, as clearly shown in Figure 1 of the drawing and to the outer side of which is pivotally secured as at 11 through the instrumentality of a bolt, the hand operated lever 12; the lower end portion of the hand lever 12 is bifurcated as at 13 and provides a pair of spaced parallel legs 14.

The front brake 15 includes a substantially arcuate shaped portion 16 which further includes a forward pointed end portion 17. In order to provide suitable anchoring or supporting means upon the front axle for the brake 15 I provide a pair of substantially U-shaped companion members 19 having offset apertured lug members 20. These companion members 19 are placed upon opposite sides of the front axle 21 and receive suitable fastening elements 22 within the offset apertured lug members 20 whereby the companion members are rigidly secured to the axle 21. The forward companion member 19 includes a pair of spaced apertured lug members 23 which pivotally receive the inner end portion of the brake 15 therein through the instrumentality of a pivot pin 24. An upwardly inclined leg 26 extends upwardly from the front brake 15 and above the front axle 21 an appreciable distance.

A rear brake 27 being correspondingly shaped as the front brake 15 and which includes an opening 28, through which the axle housing 29 is inserted. In order to provide means for holding the rear brake 27 against lateral or sidewise movement there is provided a pair of clamp members 30 which are arranged upon opposite sides and lying flush with the opposite sides of the rear brake 27 and are held fixed to the axle housing 29 through the instrumentality of fastening devices in the form of bolts 31. Extending upwardly and forwardly from the rear brake 27 is an upwardly inclined lug extension 32, the purpose of which will be presently apparent.

As stated in the foregoing the lower end portion of the hand lever 12 is bifurcated as at 13 and provides a pair of spaced parallel legs 14 and in order to provide connecting or operating means for the brakes 15 and 27 respectively there is provided a pair of connecting rods 32 and 33 respectively which are connected to the extensions 26 and 32 of the front and rear brakes 15 and 27 respectively in order that the throwing of the same is assured In order to facilitate the holding of the brakes in their thrown position there is provided a semi-circular segment 34 having a plurality of forty-five degree notches arranged around the inner periphery thereof as at 35 and which has its opposite end portions secured as at 36 to the side bar 10 of the vehicle and arranged in juxtaposition with the operating lever 12 and upon the outer side thereof. Pivotally mounted to the outer side of the operating lever 12 is a pivotally secured dog 37 which has one end sharpened or pointed and adapted to selectively engage any one of the forty-five degree notches arranged upon the inner periphery of the semi-circular segment 34; the opposite end of said dog having a retractile spring 38 connected therewith and having the opposite end thereof secured as at 39 to the operating lever 12 just above the bifurcated portion 13 thereof. In order to provide means for disengaging the dog 37 from any of the notches 35 arranged in the segment 34 there is provided an auxiliary handle member 40 which is pivoted as at 41 to the operating lever or handle 12 and has a vertically extending bar or connecting link 42 connected to the lower end portion thereof and pivotally secured to the opposite end portion of the dog 37 in order to facilitate the disengagement of same with the notches 35. When leaving the vehicle and in order to provide suitable means for assuring that the brakes will be held firmly and against accidental displacement from their retracted position there is provided a substantially U-shaped offset member 43 which has its free end portions pivotally secured to the under side or to the instrument board or any suitable portions thereof and has its looped portion 44 received within the notch 45 arranged within the upper portion of the operating handle or lever 12.

In the operation of the present invention it will be clearly apparent that upon the throwing of the levers 12 and 40 in either direction that the brakes 15 and 27 will be engaged and disengaged with the ground, road or the like upon which the vehicle is supported. In the position as clearly illustrated in Figure 1 of the drawing, namely, the levers 12 and 40 being in a substantially vertical position with respect to the side bars 10 of the vehicle and engaged by the U-shaped member 43 within the slotted portion 45 in the upper portion of the operating lever 12 in order that the same may be held against accidental displacement if by chance the dog 37 becomes disengaged from the notches 35 arranged in the segment 34. When the levers 12 and 40 are disengaged from the U-shaped member 43 and the same allowed to swing forwardly beneath the instrument board of the vehicle, it will be seen that the brakes 15 and 27 respectively will be alternately forced downwardly upon their pivots and firmly engage the road bed in either the front or the rear of the vehicle.

The invention is susceptable of various changes in its form, proportions and minor details of construction, and the right is herein reserved to make such changes as properly fall within the scope of the appended claims.

Having thus described my invention what is claimed is:—

1. A brake mechanism for use upon automobiles comprising front and rear brakes respectively, the rear brake being pivotally secured upon the rear axle housing of the vehicle, a pair of clamping members arranged upon opposite sides of the rear brake and firmly engaging the rear axle housing thereof, extension members provided upon the inner end portions of the brakes, manually operated means pivotally secured to one of the side bars of the vehicle, and having pivoted connecting means to the lower end portion thereof and having their opposite ends correspondingly secured to the inner end portions of the brakes, manually operated spring retractile means arranged upon the manually operated braking means, an auxiliary locking means included upon the upper end portion of the manually operated means.

2. A braking mechanism for use upon motor vehicles comprising front and rear brakes respectively, the rear brake having an enlarged apertured portion and received on the rear axle housing of the vehicle, a pair of clamping members arranged upon the axle housing and upon opposite sides of the rear brake, a front brake having its inner end portion pivotally secured to the front axle, each of said brakes including inwardly extending apertured portions, a manually operated lever arranged upon the outer side of one of the side bars of the vehicle, connecting bars pivotally secured to the handle lever and brake extensions respectively, a notched segment arranged in juxtaposition with the hand operated lever, a pivotally mounted spring retractile dog arranged upon the outer side of the hand lever and adapted for selective engagement within the notched portions of the segment, a substantially U-shaped member pivotally secured to the under side of the instrument board and adapted for selective engagement with its yoked portion within the upper portion of the hand operated lever.

3. A brake mechanism for use upon motor vehicles comprising front and rear brakes respectively, a rear brake having an enlarged apertured portion and received upon the rear axle housing of the vehicle, a pair of clamping members arranged upon the housing and upon opposite sides of the brake, a bifurcated member arranged upon the front portion of the front axle, a front brake having an inner apertured portion and pivotally secured between the parallel legs of the bifurcated member, each of said brakes including inwardly extending apertured portions, a manually operated lever pivotally secured to one of the side bars of the vehicle, connecting bars pivotally secured to the lower end portion of the lever and brake extensions respectively, a segment having a plurality of notched portions therein and arranged in juxtaposition with the outer side of the manually operated lever, a spring retractile dog pivotally secured to the outer side of the lever and adapted to selectively engage the notched portions of the segment, and a substantially U-shaped offset member having its free end portion pivotally secured to the instrument board of the vehicle and adapted to selectively position its yoked portion within a reset provided in the upper end portion of the hand operated lever.

In testimony whereof I affix my signature.

FRANK WATKINS.